(12) United States Patent
Chamoun et al.

(10) Patent No.: US 11,543,611 B2
(45) Date of Patent: Jan. 3, 2023

(54) SMART CASSETTE FOR INSTALLING OPTICAL FIBER

(71) Applicant: Palo Alto Research Center Incorporated, Palo Alto, CA (US)

(72) Inventors: Jacob N. Chamoun, Somerville, MA (US); Qiushu Chen, San Jose, CA (US); Peter Kiesel, Palo Alto, CA (US); Kyle Arakaki, Mountain View, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 0 days.

(21) Appl. No.: 17/235,311

(22) Filed: Apr. 20, 2021

(65) Prior Publication Data

US 2022/0334336 A1 Oct. 20, 2022

(51) Int. Cl.
*G02B 6/44* (2006.01)
*G01L 5/04* (2006.01)
*G01N 21/896* (2006.01)

(52) U.S. Cl.
CPC .............. *G02B 6/4463* (2013.01); *G01L 5/04* (2013.01); *G01N 21/896* (2013.01); *G02B 6/4453* (2013.01); *G02B 6/4457* (2013.01)

(58) Field of Classification Search
CPC .......................................... G02B 6/4452–4458
See application file for complete search history.

(56) References Cited

U.S. PATENT DOCUMENTS

| 6,668,105 | B2 | 12/2003 | Chen et al. |
| 7,315,681 | B2 | 1/2008 | Kewitsch |
| 7,358,858 | B2 | 4/2008 | Ozawa et al. |
| 8,474,742 | B2 | 7/2013 | Smrha |
| 10,838,163 | B2 | 11/2020 | Gronvall |
| 2014/0219615 | A1 | 8/2014 | Petersen et al. |
| 2018/0066509 | A1* | 3/2018 | Fouda ................. E21B 47/01 |
| 2019/0062100 | A1 | 2/2019 | Mertesdorf |

FOREIGN PATENT DOCUMENTS

| CN | 208530994 U | * | 2/2019 | |
| CN | 111812785 | | 10/2020 | |
| CN | 112217144 | | 1/2021 | |
| EP | 2247971 | | 11/2010 | |
| FR | 2630419 | | 10/1989 | |
| JP | H0352704 U | * | 5/1991 | |
| WO | WO-03056376 A1 | * | 7/2003 | ............. B65H 59/00 |
| WO | 2005031401 | | 4/2005 | |

OTHER PUBLICATIONS

English translation of CN 208530994 U (Year: 2019).*
European Patent Application No. 22165807.3, Extended European Search Report dated Aug. 25, 2022; 6 pages.

* cited by examiner

*Primary Examiner* — Charlie Y Peng
(74) *Attorney, Agent, or Firm* — Mueting Raasch Group

(57) ABSTRACT

An apparatus includes a cassette configured to hold optical fiber comprising one or more optical sensors. The cassette comprises a spool configured to one or more of extract and retract the optical fiber from the cassette. A fiber monitor is coupled to the cassette. The fiber monitor is configured to monitor at least one parameter of the optical fiber as the optical fiber is extracted from the cassette.

19 Claims, 9 Drawing Sheets

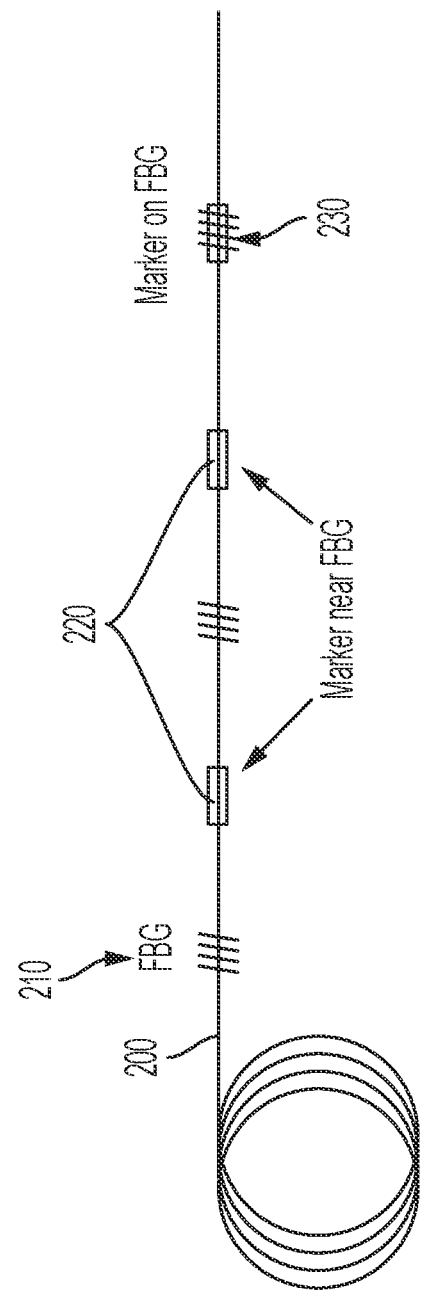

SMART CASSETTE FOR INSTALLING OPTICAL FIBER

TECHNICAL FIELD

This application relates generally to techniques for structural health monitoring. The application also relates to components, devices, systems, and methods pertaining to such techniques.

BACKGROUND

Fiber optic (FO) sensors can be used for detecting parameters such as strain, temperature, pressure, current, voltage, chemical composition, and vibration. FO sensors are attractive components because they are thin, lightweight, sensitive, robust to harsh environments, and immune to electromagnetic interference (EMI) and electrostatic discharge. FO sensors can be arranged to simultaneously measure multiple parameters distributed in space with high sensitivity in multiplexed configurations over long optical fiber cables. One example of how this can be achieved is through fiber Bragg grating (FBG) sensors. A FBG sensor is formed by a periodic modulation of the refractive index along a finite length (typically a few mm) of the core of an optical fiber. This pattern reflects a wavelength, called the Bragg wavelength, determined by the periodicity of the refractive index profile. The Bragg wavelength is sensitive to external stimulus (strain and/or temperature, etc.) that changes the periodicity of the grating and/or the index of refraction of the fiber. Thus, FBG sensors rely on the detection of small wavelength changes in response to stimuli of interest. In some implementations, FO sensors can be attached to structures and operated to detect parameters, e.g., strain, temperature, vibration, related to the health of the structures.

SUMMARY

Embodiments described herein involve an apparatus comprising a cassette configured to hold optical fiber comprising one or more optical sensors. The cassette comprises a spool configured to one or more of extract and retract the optical fiber from the cassette. A fiber monitor is coupled to the cassette. The fiber monitor is configured to monitor at least one parameter of the optical fiber as the optical fiber is extracted from the cassette.

Embodiments involve a method for monitoring a condition of an optical fiber. Optical fiber comprising one or more optical sensors is extracted from a cassette. At least one parameter of the optical fiber is monitored as the optical fiber is extracted from the cassette. The at least one condition comprises one or more of a spooling length, a spooling condition, a total length dispensed, an approximate distance to an optical sensor, a fiber tension, and a fiber integrity.

BRIEF DESCRIPTION OF THE DRAWINGS

Throughout the specification reference is made to the appended drawings wherein:

FIG. 2A illustrates an optical fiber having one or more optical sensors with markers disposed next to and/or on the optical sensors in accordance with embodiments described herein;

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

Some embodiments disclosed herein involve apparatuses for attaching FO sensors to structures. Fiber optic sensors can be deployed on various types of structures, e.g., bridges, roadways, railways, and electrical devices such as transformers, to monitor the structural health of the structures. The disclosed embodiments can facilitate mounting FO sensors to the structures in such a way that strain from the structures is transmitted to the sensors. The approaches discussed herein provide for attachment of FO sensors that is flexible enough to attach the FO sensors to a variety of different substrates, e.g. concrete, metal, and wood. Repeatability of the attachment is desired so that at least some or most of the FO sensors have the same pre-strain once attached. The disclosed attachment approaches can be simple and rapid to perform to facilitate the deployment of multiple FO sensors on a structure. Installing optical fibers on structures involves extensive fiber handling during the install. Optical fibers are fragile, and breaks and/or tangles cost time, which is detrimental e.g. because roads must be shut down to service a structure. According to various configurations, the sensors may be fiber Bragg grating (FBG) strain sensors, Fabry Perot sensors, and/or other interferometric optical sensors. In some cases, the sensors may include one or more of electrical and/or resistive sensors, mechanical sensors, and/or other types of strain gages. In some cases, a combination of different types of sensors may be used.

Embodiments described herein involve an optical fiber cassette that is configured to allow the extraction of optical fiber as it is being installed. The cassette may include a fiber monitoring system. For example, An FO sensor identifying mechanism can be included which alarms (sound, light, or any other type of signal to a fiber monitoring system) when the fiber is unspooled to a sensing point to be installed; the identifying mechanism can alarm when spooling is to a point that has a specific distance to the next sensing point as well. The identifying mechanism can be used to calibrate the real-time monitoring results of a smart cassette. The sensor identifier can be configured to communicate with the spooling mechanism and trigger a "lock-up" mode of the spool once a specific installation point is identified.

Figure 1A:
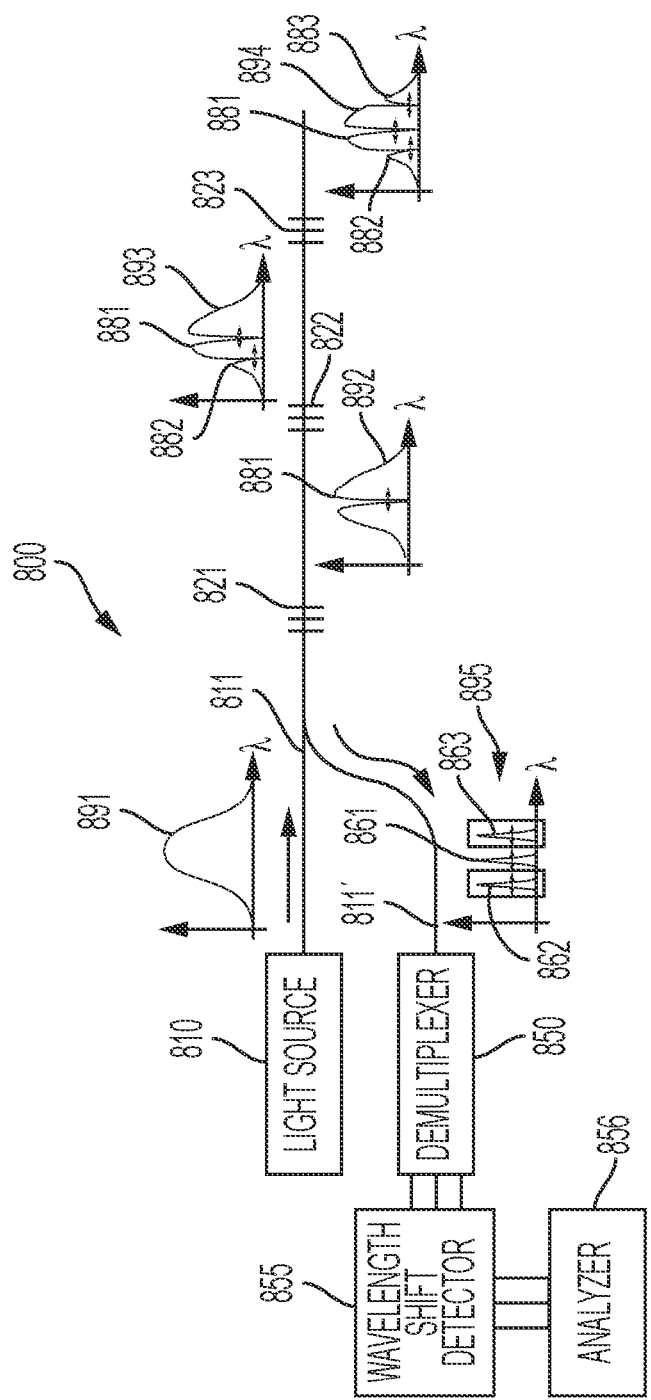
FIG. 1A shows a wavelength multiplexed system can use a compensated sensor array comprising multiple FBG sensors disposed on a single optical fiber in accordance with embodiments described herein.

FO sensors can simultaneously measure multiple parameters distributed in space with high sensitivity in multiplexed configurations over long FO cables. One example of how this can be achieved is through fiber Bragg grating (FBG) sensors. FIG. 1A shows a wavelength multiplexed system 800 can use a compensated sensor array comprising multiple FBG sensors 821, 822, 823 disposed on a single optical fiber 811. The sensors 821-823 may be arranged to sense parameters including one or more of temperature, strain, and/or vibration, for example. As indicated in FIG. 8, input light is provided by the light source 810, which may comprise or be a light emitting diode (LED) or superluminescent laser diode (SLD), for example. The spectral characteristic (intensity vs. wavelength) of broadband light is shown by inset graph 891. The intensity is highest near the middle of the spectrum and falls off at the spectrum edges. The sensors 821, 822, 823 include compensation, e.g., one or more of different reflectivities and different attenuations, that decreases the difference in the intensity of the output signal light reflected by the sensors to compensate for the input light that is non-uniform in intensity, e.g., due to spectral non-uniformity of the light source and/or scattering losses in the optical fiber. The input light is transmitted via the optical fiber (FO) cable 811 to the first FBG sensor 821. The first FBG sensor 821 reflects a portion of the light in a first wavelength band having a central wavelength, $\lambda 1$. Light having wavelengths other than within the first wavelength band is transmitted through the first FBG sensor 821 to the second FBG sensor 822. The spectral characteristic of the light transmitted to the second FBG sensor 822 is shown in inset graph 892 and exhibits a notch 881 at the first wavelength band centered at $\lambda 1$ indicating that light in this wavelength band is reflected by the first sensor 821.

The second FBG sensor 822 reflects a portion of the light in a second wavelength band having a central wavelength, $\lambda 2$. Light that is not reflected by the second FBG sensor 822 is transmitted through the second FBG sensor 822 to the third FBG sensor 823. The spectral characteristic of the light transmitted to the third FBG sensor 823 is shown in inset graph 893 and includes notches 881, 882 centered at $\lambda 1$ and $\lambda 2$.

The third FBG sensor 823 reflects a portion of the light in a third wavelength band having a central or peak wavelength, $\lambda 3$. Light that is not reflected by the third FBG sensor 823 is transmitted through the third FBG sensor 823. The spectral characteristic of the light transmitted through the third FBG sensor 823 is shown in inset graph 894 and includes notches 881, 882, 883 centered at $\lambda 1$, $\lambda 2$, and $\lambda 3$.

Light in wavelength bands 861, 862, 863, having central wavelengths $\lambda 1$, $\lambda 2$ and $\lambda 3$ (illustrated in inset graph 895) is reflected by the first, second, or third FBG sensors 821, 822, 823, respectively, along the FO cables 811 and 811' to an the optical wavelength demultiplexer 850. Compensating input characteristics of sensors 821, 822, 823 cause the difference in the intensity peaks of the light 861, 862, 863 to be reduced when compared to the intensity peaks from an uncompensated sensor array.

From the wavelength demultiplexer 850, the sensor light 861, 862, 863 may be routed to a wavelength shift detector 855 that generates an electrical signal responsive to shifts in the central wavelengths $\lambda 1$, $\lambda 2$ and $\lambda 3$ and/or wavelength bands of the sensor light. The wavelength shift detector 855 receives reflected light from each of the sensors and generates corresponding electrical signals in response to the shifts in the central wavelengths $\lambda 1$, $\lambda 2$ and $\lambda 3$ or wavelength bands of the light reflected by the sensors 821-823. The analyzer 856 may compare the shifts to a characteristic base wavelength (a known wavelength) to determine whether changes in the values of the parameters sensed by the sensors 821-823 have occurred. The analyzer 856 may determine that the values of one or more of the sensed parameters have changed based on the wavelength shift analysis and may calculate a relative or absolute measurement of the change.

In some cases, instead of emitting broadband light, the light source may scan through a wavelength range, emitting light in narrow wavelength bands to which the various sensors disposed on the FO cable are sensitive. The reflected light is sensed during a number of sensing periods that are timed relative to the emission of the narrowband light. For example, consider the scenario where sensors 1, 2, and 3 are disposed on a FO cable. Sensor 1 is sensitive to a wavelength band (WB1), sensor 2 is sensitive to wavelength band WB2, and sensor 3 is sensitive to WB3. The light source may be controlled to emit light having WB1 during time period 1 and sense reflected light during time period 1*a* that overlaps time period 1. Following time period 1*a*, the light source may emit light having WB2 during time period 2 and sense reflected light during time period 2*a* that overlaps time period 2. Following time period 2*a*, the light source may emit light having WB3 during time period 3 and sense reflected light during time period 3*a* that overlaps time period 3. Using this version of time domain multiplexing, each of the sensors may be interrogated during discrete time periods. When the intensity of the narrowband light sources varies, a compensated sensor array as discussed herein may be useful to compensate for the intensity variation of the sources.

The FO cable may comprise a single mode (SM) FO cable or may comprise a multi-mode (MM) FO cable. While single mode fiber optic cables offer signals that are easier to interpret, to achieve broader applicability and lower costs of fabrication, multi-mode fibers may be used. MM fibers may be made of plastic rather than silica, which is typically used for SM fibers. Plastic fibers may have smaller turn radii when compared with the turn radii of silica fibers. This can offer the possibility of curved or flexible configurations, for example. Furthermore, MM fibers can work with less expensive light sources (e.g., LEDs) as opposed to SM fibers that may need more precise alignment with superluminescent diodes (SLDs). Therefore, sensing systems based on optical sensors in MM fibers may yield lower cost systems.

Figure 1B:
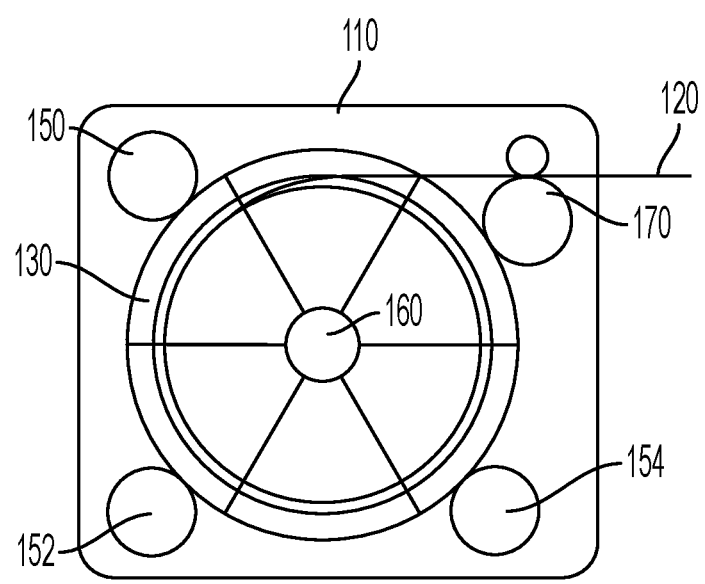
FIG. 1B illustrates an example cassette for handling optical fiber in accordance with embodiments described herein.

According to various configurations, a cassette may be used for handling optical fiber having a plurality of sensors while it is being installed on a surface. FIG. 1B illustrates an example cassette for handling optical fiber in accordance with embodiments described herein. Embodiments described herein involve a cassette 100 that houses an optical fiber spool 130 inside a cassette body 150 in accordance with embodiments described herein. The cassette may have one or more additional mechanisms that may be important for the installation of optical fiber sensors.

For example, the cassette 110 may include one more bushings 150, 152, 154 that help to prevent the optical fiber 120 from jumping off the spool 130. The bushings 150, 152, 154 may be configured to press up against the outside edge of the spool 130 and move along the spool 130 as the spool 130 rotates. The bushings 150, 152, 154 may be configured to move along the spool by one or more of a sliding motion and a rolling motion. For example, the bushings 150, 152, 154 may slide along the spool as it rotates e.g. using a flexible plastic or roll along the spool 130 as with a plastic or rubber bushing.

A shaft 160 may be disposed such that the spool 130 is configured to rotate about the shaft. The shaft and/or bushings may be adjustable to accommodate optical fiber spools or different sizes, for example. A cassette having an adjustable shaft and/or bushings is described in further detail in U.S. application Ser. No. 17/235,138, which is incorporated by reference in its entirety.

In some embodiments, the cassette 110 may feature a guide feed 170 located where the optical fiber 120 exits the cassette 110. The guide feed 170 may be configured to move back and forth parallel to the axis of the spool 130 as the optical fiber 120 retracts. This guide feed 170 prevents the retracted optical fiber 120 from bunching up on one end of the spool 130 as the optical fiber 120 retracts. The guide feed 170 may be especially useful when large lengths of optical fiber 120 need to be retracted, such as in the case of a reloadable spool, for example. The guide feed 170 may feature a large bend radius that prevents the optical fiber 120 from undergoing a sharp bend at the exit of the cassette 100.

Figure 2B:
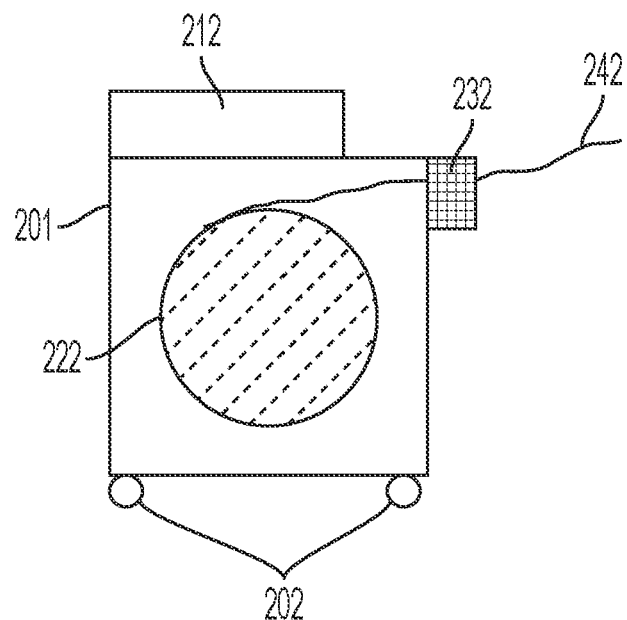
FIG. 2B shows a system configured to determine a presence of optical sensors using the markers as the optical fiber is extracted from a spool in accordance with embodiments described herein.

FIG. 2A illustrates an optical fiber 200 having one or more optical sensors 210. Markers 220, 230 may be disposed on and/or near (e.g. a predetermined distance) the one or more optical sensors 210. FIG. 2B shows a system configured to determine a presence of optical sensors 210 using the markers 220, 230 as the optical fiber 242 is extracted from a spool 222 in accordance with embodiments described herein. The cassette 201 houses an optical fiber spool 222 inside a cassette body. The cassette 201 may be similar to what is described in conjunction with FIG. 1. The cassette has one or more mounting points 202 configured to allow mounting of the cassette during installation of the optical fiber. For example, the mounting points 202 may include one or more of a magnet and a carabiner attachment point.

An optical fiber monitor 232 may be disposed at an optical fiber exit point of the cassette 201. The optical fiber monitor 232 may be configured to monitor at least one parameter of the optical fiber as the optical fiber is extracted from the cassette. For example, the at least one parameter includes a spooling length, a spooling condition, a total length dispensed, an approximate distance to an optical sensor, a fiber tension, and/or a fiber integrity.

According to various embodiments, as the optical fiber 242 is extracted from the cassette 201, the optical fiber monitor 232 is configured to detect the presence of markers and thus determine the location of the one or more sensors along the optical fiber 242. In some cases, the optical fiber monitor 232 may be able to determine a total length of optical fiber dispensed. A spool monitor 212 may be disposed on or near the cassette. The spool monitor 212 may be configured to display one or more of the parameters monitored by the optical fiber monitor 232. For example, the spool monitor 212 may be configured to display the total amount of optical fiber 242 dispensed and/or the distance to the next optical sensor.

Figure 2C:
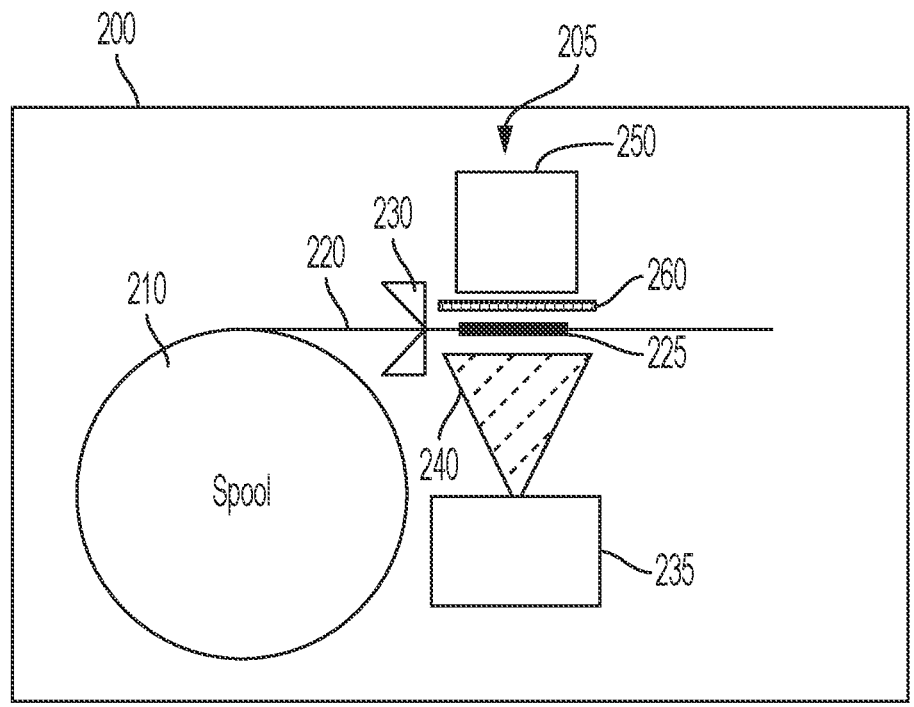
FIG. 2C illustrates a system having an optical fiber that contains one or more labeled sensors in accordance with embodiments described herein.

FIG. 2C illustrates a system 207 having an optical fiber 220 that contains one or more markers 225. In some embodiments, the markers 225 may be coincident with sensors, and in some embodiments the markers may be between sensors. According to various configurations, the markers 225 are distinguished using an optical dye that has at least one optical characteristic. For example, the optical characteristic may include one or more of absorption and fluorescence.

As the optical fiber 220 is unspooled from the spool 210, a guide feed 230 directs the optical fiber 220 into an interrogation section 205. The interrogation section 205 includes an illumination source 235 that is configured to generate illumination 240 on the optical fiber 220 to create a light signal. A detector 250 is disposed close to the optical fiber 220 and is configured to detect the light signal of one or more of a transmission and a reflection. The detector converts the light signal to an electrical signal. If a particular optical characteristic is observed, the detector may be configured to send an alert that a sensor is located in the optical fiber portion that is in the interrogation section. The particular optical characteristic comprises one or more of a change in absorption and a change in fluorescence. According to various configurations, the particular optical characteristic is an increase in fluorescence beyond a predetermined threshold for example. An emission filter 260 may be disposed between the detector 250 and the optical fiber and may be configured to block illumination wavelengths and pass fluorescence wavelengths.

Figure 3A:
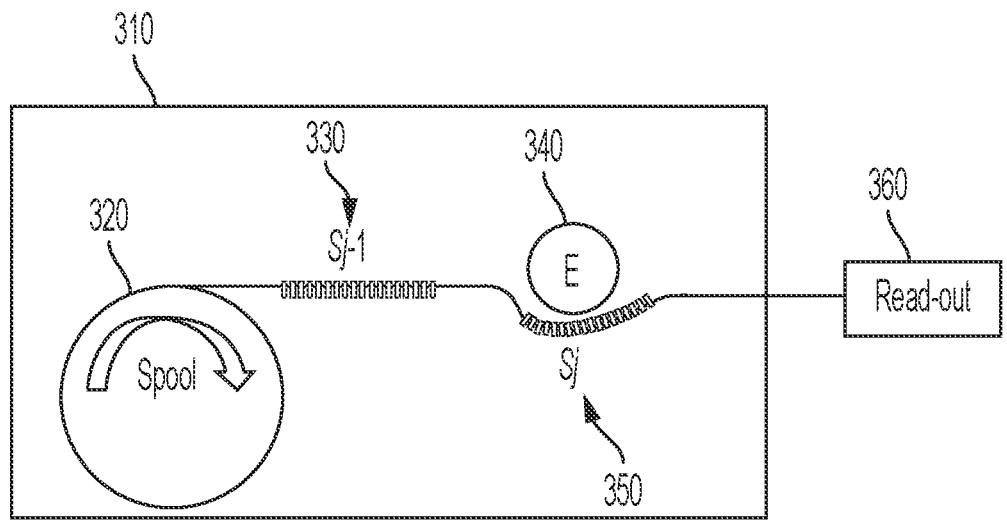
FIGS. 3A and 3B illustrate another system for detecting sensors along an optical fiber in accordance with embodiments described herein.
Figure 3B:
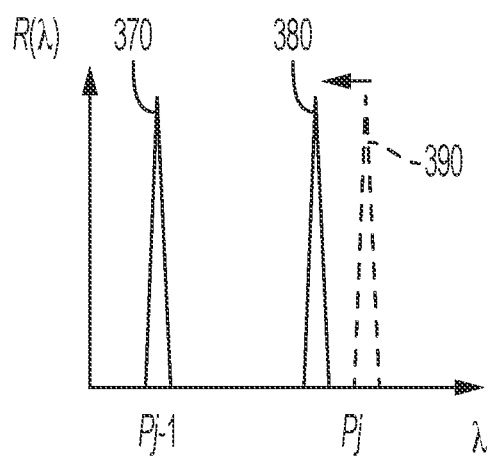

FIGS. 3A and 3B illustrate another system 300 for detecting sensors 330 along an optical fiber 325. The cassette includes an element E 340 inside the that is configured to impose a wavelength shift on a fiber sensor as the optical fiber 325 is unwound from the spool 320 through one or more of temperature and strain. For example, the element E may include one or more of a heater and a stretcher. In some cases, the spool 320 is Element E such that the wavelength shift occurs as the optical fiber 325 is unwound from the spool.

A read-out system 360 at either end of the optical fiber 325 is configured to measure reflection peaks {p} 370, 380 corresponding to each sensor. When the read-out sees a peak $p_j$ shift from a first location 390 to a second location 380, it sends an alert that a sensor is located at E. If the readout is at the spool end, a fiber optic rotary joint may be used to connect to the spool. The alert may be in the form of a visual alert, an audible alert and/or a tactile alert.

Figure 4A:
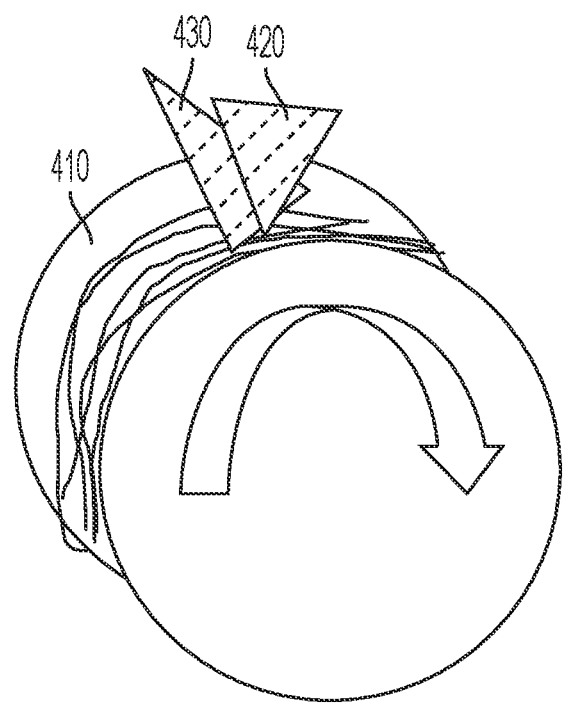
FIGS. 4A and 4B illustrate a system for determining a total length of optical fiber dispensed in accordance with embodiments described herein.
Figure 4B:
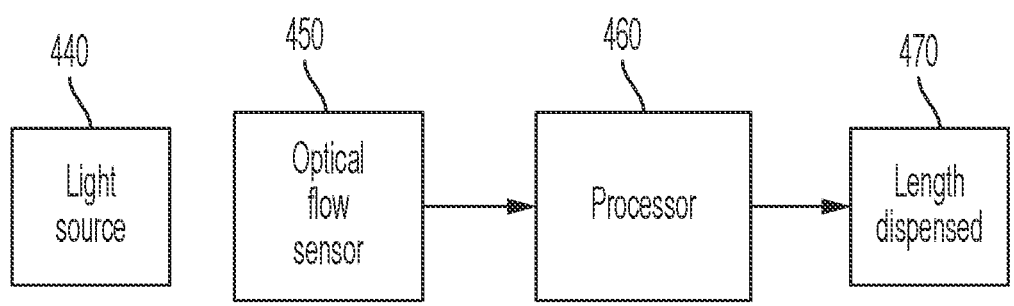

FIGS. 4A and 4B illustrate a system for determining a total length of optical fiber dispensed in accordance with embodiments described herein. A light source (not shown) is configured to illuminate 430 the surface of a spool 410. An optical flow sensor 440 is configured to detect relative motion of the sensor and/or the surface of the spool 410 based on a light signal 420. A processor 460 is coupled to the optical flow sensor 440 and is configured to sum the relative motion to calculate the total length dispensed 470. The total length dispensed may be shown on a display on the cassette, for example. According to various embodiments an initial marking is disposed on the optical fiber at a beginning of the optical fiber on the spool. A length dispensed may be continuously calculated while the optical fiber is being dispensed. Dead reckoning can then be used to determine the total length dispensed based on the initial marking and the current length dispensed.

Figure 5:
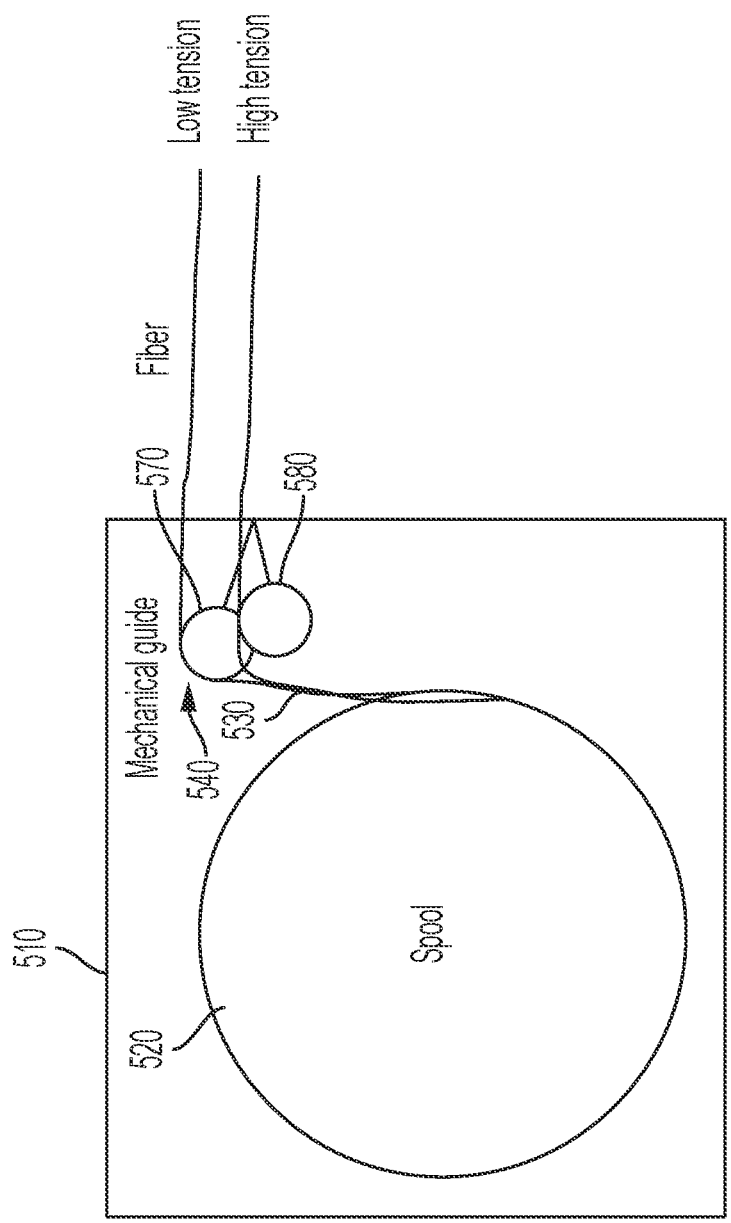
FIG. 5 illustrates a optical fiber tension monitor system in accordance with embodiments described herein.

FIG. 5 illustrates an optical fiber tension monitor system 510 in accordance with embodiments described herein. A mechanical guide may be configured to contact the optical fiber as it leaves the cassette. The tension of the optical fiber 530 causes motion of the mechanical guide 540 as the optical fiber 530 is unwound from the spool 520. According to various embodiments, an encoder can be coupled to the mechanical guide 540 such that fiber tension can be calculated based on the motion of the mechanical guide. For example, the mechanical guide 540 may move to a first position 570 when the tension of the optical fiber 530 is low and a second position 580 when the tension of the optical fiber 530 is high. The system may be configured to control a speed at which the optical fiber is extracted from the spool based on the tension. According to various embodiments, the system may be configured to automatically release a brake if it is determined that the tension of the optical fiber 530 is above a predetermined threshold. This may prevent damage and/or breakage of the optical fiber. The predetermined threshold may be about 75% of the fiber breaking force, for example.

Figure 6:
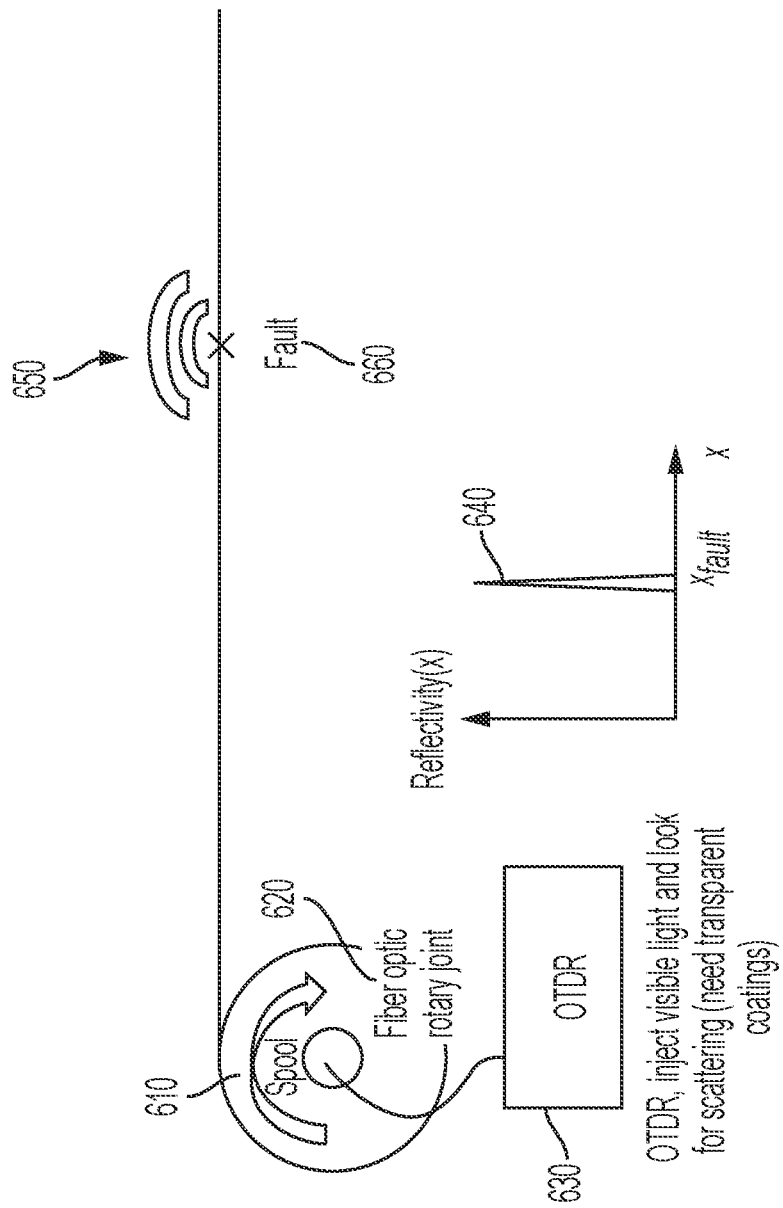
FIG. 6 illustrates a system for detecting faults in an optical fiber as it is extracted from a spool in accordance with embodiments described herein.

FIG. 6 illustrates a system for detecting faults in an optical fiber as it is extracted from a spool 610 in accordance with embodiments described herein. An optical time domain reflectometer (OTDR) 630 is coupled to one end of the optical fiber via a fiber optic rotary joint 620. Visible light is injected into a fiber optic rotary joint 620. A fault 660 in the optical fiber may cause light 650 to be scattered out of the optical fiber and/or back to the OTDR 620. The OTDR 620 is configured to detect a peak 640 that corresponds to a location of the fault 660.

Figure 7:
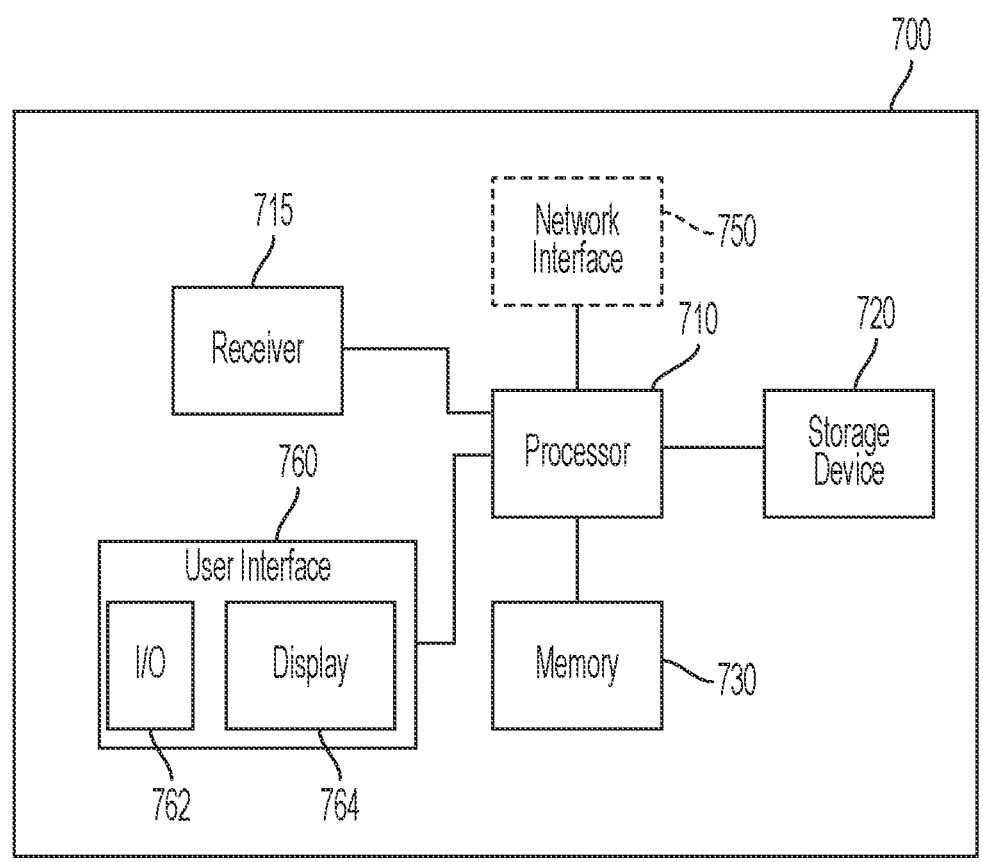
FIG. 7 illustrates an example computer capable of executing the methods described herein.

The systems described herein can be implemented by a computer using well-known computer processors, memory units, storage devices, computer software, and other components. A high-level block diagram of such a computer is illustrated in FIG. 7. Computer 700 contains a processor 710, which controls the overall operation of the computer 700 by executing computer program instructions which define such operation. It is to be understood that the processor 710 can include any type of device capable of executing instructions. For example, the processor 710 may include one or more of a central processing unit (CPU), a graphical processing unit (GPU), a field-programmable gate array (FPGA), and an application-specific integrated circuit (ASIC). The computer program instructions may be stored in a storage device 720 and loaded into memory 730 when execution of the computer program instructions is desired. Thus, the steps of the methods described herein may be defined by the computer program instructions stored in the memory 730 and controlled by the processor 710 executing the computer program instructions. The computer 700 may include one or more network interfaces 750 for communicating with other devices via a network. The computer 700 also includes a user interface 760 that enable user interaction with the computer 700. The user interface 760 may include I/O devices 762 (e.g., keyboard, mouse, speakers, buttons, etc.) to allow the user to interact with the computer. Such input/output devices 762 may be used in conjunction with a set of computer programs in accordance with embodiments described herein. The user interface may include a display 764. The computer may also include a receiver 715 configured to receive data from the user interface 760 and/or from the storage device 720. According to various embodiments, FIG. 7 is a high-level representation of possible components of a computer for illustrative purposes and the computer may contain other components.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g. 1 to 5 includes 1, 1.5, 2, 2.75, 3, 3.80, 4, and 5) and any range within that range.

The various embodiments described above may be implemented using circuitry and/or software modules that interact to provide particular results. One of skill in the computing arts can readily implement such described functionality, either at a modular level or as a whole, using knowledge generally known in the art. For example, the flowcharts illustrated herein may be used to create computer-readable instructions/code for execution by a processor. Such instructions may be stored on a computer-readable medium and transferred to the processor for execution as is known in the art.

The foregoing description of the example embodiments have been presented for the purposes of illustration and description. It is not intended to be exhaustive or to limit the inventive concepts to the precise form disclosed. Many modifications and variations are possible in light of the above teachings. Any or all features of the disclosed embodiments can be applied individually or in any combination, not meant to be limiting but purely illustrative. It is intended that the scope be limited by the claims appended herein and not with the detailed description.

What is claimed is:

1. An apparatus, comprising:
a cassette configured to hold optical fiber comprising one or more optical sensors, the one or more optical sensors comprising one or more fiber Bragg grating (FBG) sensors, the cassette comprising a spool configured to one or more of extract and retract the optical fiber from the cassette; and
a fiber monitor coupled to the cassette, the fiber monitor configured to monitor at least one parameter of the optical fiber as the optical fiber is extracted from the cassette.

2. The apparatus of claim 1, wherein the at least one parameter comprises at least one of a spooling length, a spooling condition, a total length dispensed, an approximate distance to an optical sensor, a fiber tension, and a fiber integrity.

3. The apparatus of claim 1, wherein the fiber monitor comprises an optical sensor identifying mechanism configured to identify locations along the optical fiber that are on or near an optical sensor.

4. The apparatus of claim 3, wherein the sensor identifying mechanism is configured to issue an alert when at a location along the optical fiber that is on or near the location of the optical sensor.

5. The apparatus of claim 4, wherein the alert comprises one or more of a visual alert, an audible alert, and a tactile alert.

6. The apparatus of claim 5, wherein the sensor identifying mechanism is configured to cause the cassette to stop extraction of the optical fiber when on or near the optical sensor.

7. The apparatus of claim 1, wherein the fiber monitor is configured to monitor the at least one parameter using one or more labels disposed on the optical fiber.

8. The apparatus of claim 7, wherein the one or more labels comprise one or more of absorbing dye and fluorescent dye.

9. The apparatus of claim 7, further comprising:
an illumination source configured to illuminate the optical fiber as it leaves the cassette producing a light signal; and
a detector configured to detect the one or more labels based on the illumination signal.

10. The apparatus of claim 9, further comprising an emission filter disposed between the detector and the illumination source, the emission filter configured to block illumination wavelengths and pass fluorescence wavelength.

11. The apparatus of claim 1, further comprising:
a wavelength shift element configured to impose a wavelength shift on the one or more optical sensors using one or more of temperature and strain; and
a read-out system coupled to the optical fiber and configured to measure a shift in a reflection peak corresponding to one of the optical sensors from a first position to a second position.

12. The apparatus of claim 1, further comprising:
an illumination source configured to illuminate at least a portion of a spool surface;
an optical flow sensor configured to detect relative motion of the sensor in relation to the surface of the spool; and
a processor configured to determine a total length of optical fiber dispensed based on the detected relative motion.

13. The apparatus of claim 1, further comprising:
a mechanical guide configured to contact the optical fiber as it leaves the cassette, a fiber tension causing motion of the mechanical guide; and
an encoder configured to output a fiber tension based on the motion of the mechanical guide.

14. The apparatus of claim 13, further comprising a brake configured to control a speed at which the optical fiber can be extracted from the cassette, the brake configured to release if the output fiber tension is greater than a predetermined threshold.

15. The apparatus of claim 1, further comprising:
a fiber optic rotary joint;
an optical time domain reflectometer (OTDR) coupled to one end of the optical fiber via the fiber optic rotary joint, a fault in the fiber causing one or both of light to be scattered out of the fiber and light to be reflected back to the OTDR, the OTDR configured to detect a peak corresponding to a location of the fault.

16. A method for monitoring a condition of an optical fiber, comprising:
extracting optical fiber comprising one or more optical sensors from a cassette, the one or more optical sensors comprising one or more fiber Bragg grating (FBG) sensors;
monitoring at least one parameter of the optical fiber as the optical fiber is extracted from the cassette, the at least one condition comprising one or more of a spooling length, a spooling condition, a total length dispensed, an approximate distance to an optical sensor, a fiber tension, and a fiber integrity.

17. The method of claim 16, further comprising monitoring the at least one parameter using one or more labels disposed on the optical fiber.

18. The method of claim 17, further comprising:
illuminating the optical fiber as it leaves the cassette producing a light signal; and
detecting the one or more labels based on the light signal.

19. The method of claim 16, further comprising:
determining a fiber tension of the optical fiber; and
controlling a speed at which the optical fiber can be extracted from the cassette based on the fiber tension.

* * * * *